United States Patent [19]
Teng et al.

[11] Patent Number: 5,462,796
[45] Date of Patent: Oct. 31, 1995

[54] FLASH CHROMIUM INTERLAYER FOR IMPROVED HARD DISK MAGNETIC RECORDING PERFORMANCE

[75] Inventors: Edward Teng; Atef H. Eltoukhy, both of Santa Clara County, Calif.

[73] Assignee: StorMedia, Inc., Santa Clara, Calif.

[21] Appl. No.: 887,187

[22] Filed: May 21, 1992

[51] Int. Cl.$^6$ ............................................. B32B 5/16
[52] U.S. Cl. ........................ 428/336; 428/694 TS; 428/694 TM; 428/694 TR; 428/611; 428/900; 204/192.15; 204/192.2
[58] Field of Search ........................ 428/336, 694, 428/900, 611; 204/192.15, 192.2

[56] References Cited

U.S. PATENT DOCUMENTS

| | | | |
|---|---|---|---|
| 4,543,301 | 9/1985 | Yazawa et al. | 428/621 |
| 5,051,288 | 9/1991 | Ahlert et al. | 428/64 |
| 5,134,038 | 7/1992 | Baseman et al. | 428/611 |

FOREIGN PATENT DOCUMENTS 140513  5/1985  European Pat. Off. .

OTHER PUBLICATIONS

Katayama et al. "Magnetic Properties and Read–Write Characteristics of Multilayer Films on a Class Substrate"; *IEEE Trans. Mag.*, vol. 24, No. 6; Nov. 1988; pp. 2982–2984.
Maloney "Sputtered Multilayered Films for Digital Magnetic Recording"; *IEEE Trans. Mag.* vol. MAG–15, No. 3; Jul. 1979; pp. 1135–1137.

*Primary Examiner*—Paul J. Thibodeau
*Assistant Examiner*—R. Follett

[57] ABSTRACT

A discontinuous flash chrome interlayer of about 5 to 25 Å is incorporated between the upper and lower magnetic recording alloy layers. This flash non-magnetic separation layer is so thin that it is, in fact, a discontinuous layer, so that while the benefits of having some chrome flashed on the surface of the first portion of the magnetic recording alloy are achieved, yet the upper and lower magnetic recording alloy layers are not completely physically separated as they are in disks made according to known sputtering processes.

10 Claims, 7 Drawing Sheets

FLASH CHROMIUM INTERLAYER FOR IMPROVED HARD DISK MAGNETIC RECORDING PERFORMANCE

FIELD OF THE INVENTION

The present invention relates generally to the field of magnetic recording disks for storing digital information, and more particularly to the use of a new non-magnetic flash layer in forming the magnetic disk to improve the magnetic characteristics of the disks.

BACKGROUND OF THE INVENTION

Thin film magnetic recording disks are widely used in the computer industry as a means for storing large amounts of digital data. Data are written onto and read from a rapidly rotating recording disk by means of a magnetic head transducer assembly that flies closely over the surface of the disk. With the development of increasingly small disk drives for incorporation into laptop and notebook size computers, as well as the need to continually increase the storage capacity of larger form factor disk drives, research is continuing to be done to optimize the magnetic performance of the disks. The magnetic disk which typically, according to present technology, is formed on an aluminum substrate comprises a series of alloys sputtered or deposited, one upon another, on the surface of the aluminum substrate. The thickness and characteristics of each of these layers is chosen to optimize the linear digital recording density of the magnetic recording disk. The objective is to form a recording disk on which the magnetic bits may be very closely spaced, without any nonuniformities occurring on the surface of the disk which could result in the inability to record data in that region. According to present technology, manufacture of the disk begins with an aluminum substrate. Because aluminum itself is relatively soft, a layer of nickel phosphorous is deposited over the aluminum to provide a hard interlayer which supports the remaining magnetic recording layers. On top of the nickel phosphorous, a layer of chromium (300–1500 Å) is deposited. The actual magnetic recording layer which is a magnetic alloy comprising cobalt, chromium or nickel chromium is then sputtered onto a thickness of 200–400 Å. Current technology has determined that the magnetic characteristics of the recording layer are optimized if a chromium interlayer of 30 to 100 Å is then deposited, followed by a second magnetic recording alloy layer of about 200–300 Å.

Among the magnetic properties which are important to a high recording density and which will be referred to in the description below are:

1. Coercivity, defined as the magnetic field required to reduce the remanence magnetic flux to 0, i.e., the field required to erase a stored bit of information. Higher coercivity in a medium allows adjacent recorded bits to be placed more closely together without mutual cancellation. Thus, higher coercivity is associated with higher information storage density.

2. Magnetic remanence, which determines the signal amplitude which can be read from an isolated pulse stored in the medium—the greater the remanence, the greater the signal amplitude which can be detected in a reading operation.

3. Loop squareness, or the ratio of magnetic remanence to saturation moment. It can be appreciated that as the saturation field becomes smaller (approaches the coercivity), it takes less field strength to switch or "write to" the medium. In practical terms, this means that when a new signal is written over an old signal, the ratio of the old signal residual to the new signal is relatively small. This ratio is referred to as overwrite, a small overwrite ratio indicating good writability.

4. Bit shift or peak shift, a phenomenon which refers to the broadening between voltage peaks, as well as reduction in peak amplitude, which occurs in the read voltage waveform, where the peak-to-peak broadening time is typically less than about 25 nsec. It is desired to achieve low bit shifting, inasmuch as bit shifting limits the resolution at which adjacent peaks can be read, and thus places an upper limit on recording density.

5. Signal amplitude, or peak-to-peak amplitude of a single pulse, as a function of recording frequency. The recording density of the medium is related to the drop in signal amplitude at increasing recording frequency.

6. Signal resolution, defined as the ratio of the high-frequency track average amplitude divided by the low-frequency track amplitude. The recording frequency at which 70% resolution is achieved represents one measure of information storage density on the disk.

SUMMARY OF THE INVENTION

Among the objects of the present invention are to provide a modified process for forming the magnetic recording layer on the surface of the magnetic disk, and specifically by dramatically modifying the presently used chromium interlayer of 30 to 100 Å which completely separates the upper and lower magnetic alloy recording layers.

An objective of this modification is to provide a disk having improved coercivity ($H_c$) as well as an improved signal-to-noise ratio for data recorded on the surface of the disk.

It is further an objective to provide a minimization of the occurrence of bit shift for bits recorded on the surface of the disk, i.e., to diminish the occurrence of a magnetic data bit being recorded in a position shifted from the optimal position where it is defined to be recorded, so that any single bit of data may be quickly located and accessed to be read or written by the transducer of the disk drive.

It is further an objective of the present invention to provide an improved process for sputtering the modified chromium interlayer in the magnetic disk of this invention to further optimize the magnetic characteristics of the resulting disk.

In brief, the objects and advantages of the invention are achieved by incorporating a discontinuous flash chrome interlayer of about 5 to 15 Å between the upper and lower magnetic recording alloy layers. This interchrome separation layer, as it may be termed, is so thin that it is, in fact, a discontinuous layer, so that while the benefits of having some chrome flashed on the surface of the first portion of the magnetic recording alloy are achieved, yet the upper and lower magnetic recording alloy layers are not completely physically separated as they are in disks made according to known sputtering processes.

In brief, an apparatus for sputtering this intermagnetic separation layer comprises a sputtering target of chrome, with a mask having an aperture located about 2 inches away from the target, the aperture being about ½ inch wide. In this way, a very consistent sputtering of the magnetic alloy surface is achieved, in which the magnetic anisotropy of the surface of the disk is always aligned with the direction of rotation of the circular magnetic recording disk, so that the magnetic recording performance of the disk is optimized.

BRIEF DESCRIPTION OF THE DRAWINGS

The present invention, together with the above and other objects and advantages, may be best understood from the following detailed description of an embodiment of the invention illustrated with reference to the drawings wherein.

DESCRIPTION OF THE PREFERRED EMBODIMENT

Figure 1:
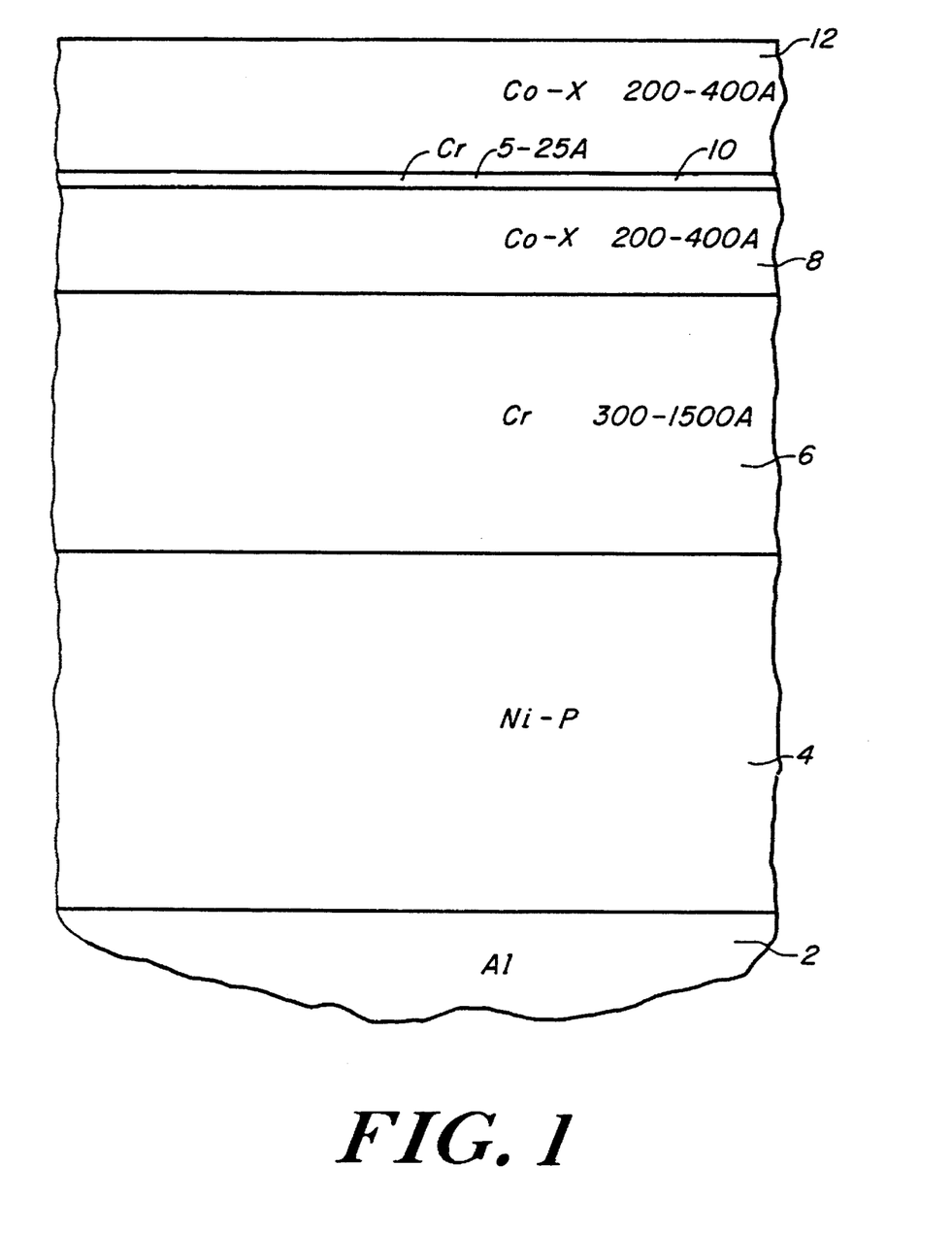
FIG. 1 is a sectional view showing the typical layers of the presently invented magnetic thin film recording disk.

FIG. 1 illustrates the layers used to form a magnetic thin film recording disk in accordance with the principles of the present invention. It should be understood that other layers may be incorporated as, for example, a carbon surface layer for wear resistance without departing from the spirit, scope and basic principles of the present invention.

Basically, such a magnetic disk typically incorporates an aluminum substrate 2, with a nickel phosphorous hardening layer 4 deposited entirely over the surface thereof. On top of this nickel phosphorous layer is a chromium underlayer 6 of 300 to 1500 Å thick. A thin magnetic recording layer 8 comprising a cobalt alloy approximately 250 Å thick is then deposited. Over the surface of this cobalt alloy, according to present technology, a chromium layer 10 of 30 to 100 Å is deposited to provide a separation between the cobalt alloy layer 8 and the cobalt alloy overlayer 12. This overlayer 12 is also about 250 Å thick and cooperates with the cobalt alloy layer 8 to provide an efficient magnetic recording media surface.

However, according to the present invention, it has been found that by reading the chromium interlayer to be only a flash of chrome of 5 to 25 Å, that the operating characteristics of the disk are substantially improved. At a thickness of 5 to 25 Å, the flash layer 10 cannot truly be considered an interlayer, and therefore we are terming it a flash non-magnetic layer, as it is not a continuous film. Typically, the layer of this thickness is effectively discontinuous. Tests have shown that the thicker interlayer 10 currently being used of 30 to 100 Å separates the upper and lower magnetic layers 8 and 12 so that the performance of the magnetic disk is not optimized. A review of the following FIGS. 2–6 demonstrates the improved magnetic performance achieved with the flash non-magnetic layer proposed in the present invention.

Figure 2:
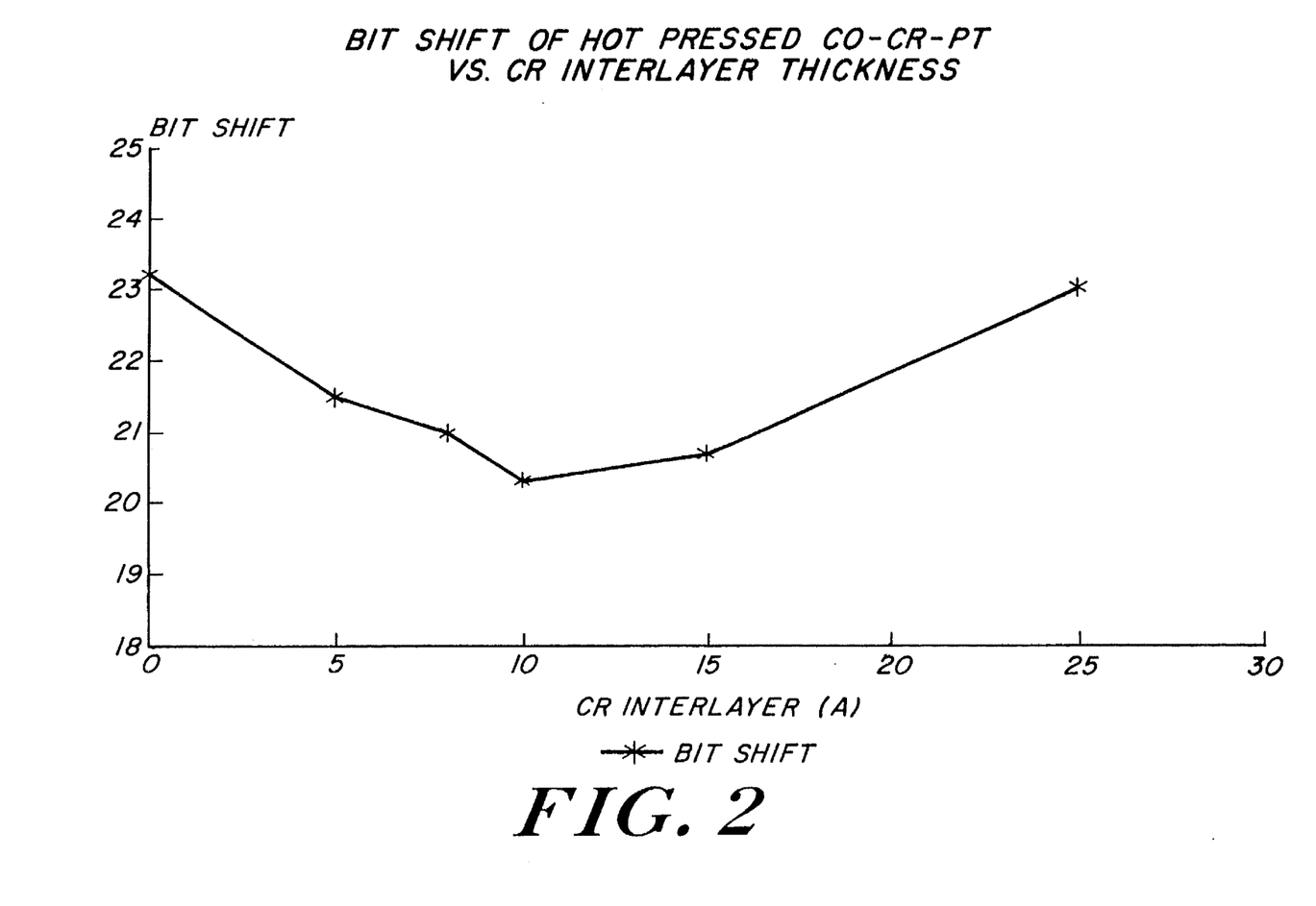
FIG. 2 is a plot of the improved bit shift characteristic of a magnetic recording disk incorporating the flash non-magnetic layer of the present invention.

Specifically, FIG. 2 is a plot of measured bit shift of hot pressed Co-Cr-Pt as a function of chromium flash non-magnetic layer thickness. It is readily apparent from the graph that the use of the above-described chromium flash non-magnetic layer provides significant improvement in the level of bit shift, and that the improvement deteriorates as the thickness of the layer increases to thicknesses where the separation of the upper and lower cobalt alloy magnetic recording layers is pronounced. It should be noted that the platinum percentage may vary in effective recording disks using such a Co-Cr-Pt layer.

Figure 3:
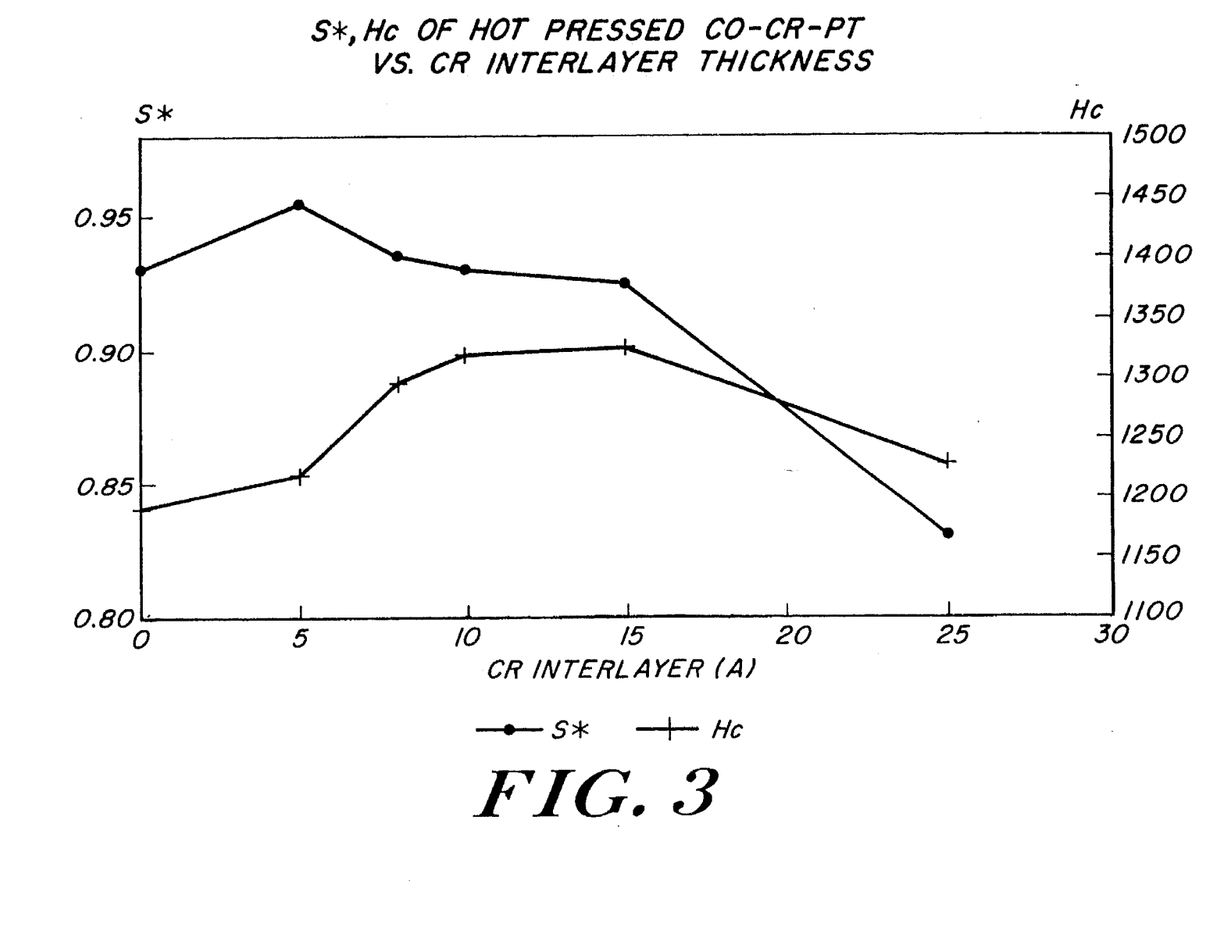
FIG. 3 is a plot of the improved coercivity and coercivity squareness of the magnetic disk formed according to the present invention.

FIG. 3 plots the measured coercivity ($H_c$) and coercivity squareness (S*) of the above-described cobalt magnetic recording alloy layer versus flash layer thickness. Once again, the coercivity and squareness which are critical measures of the ability of the magnetic recording disk to accurately record and retain data are optimized for thicknesses of the chromium flash non-magnetic layer of 5 to 25 Å.

Figure 4:
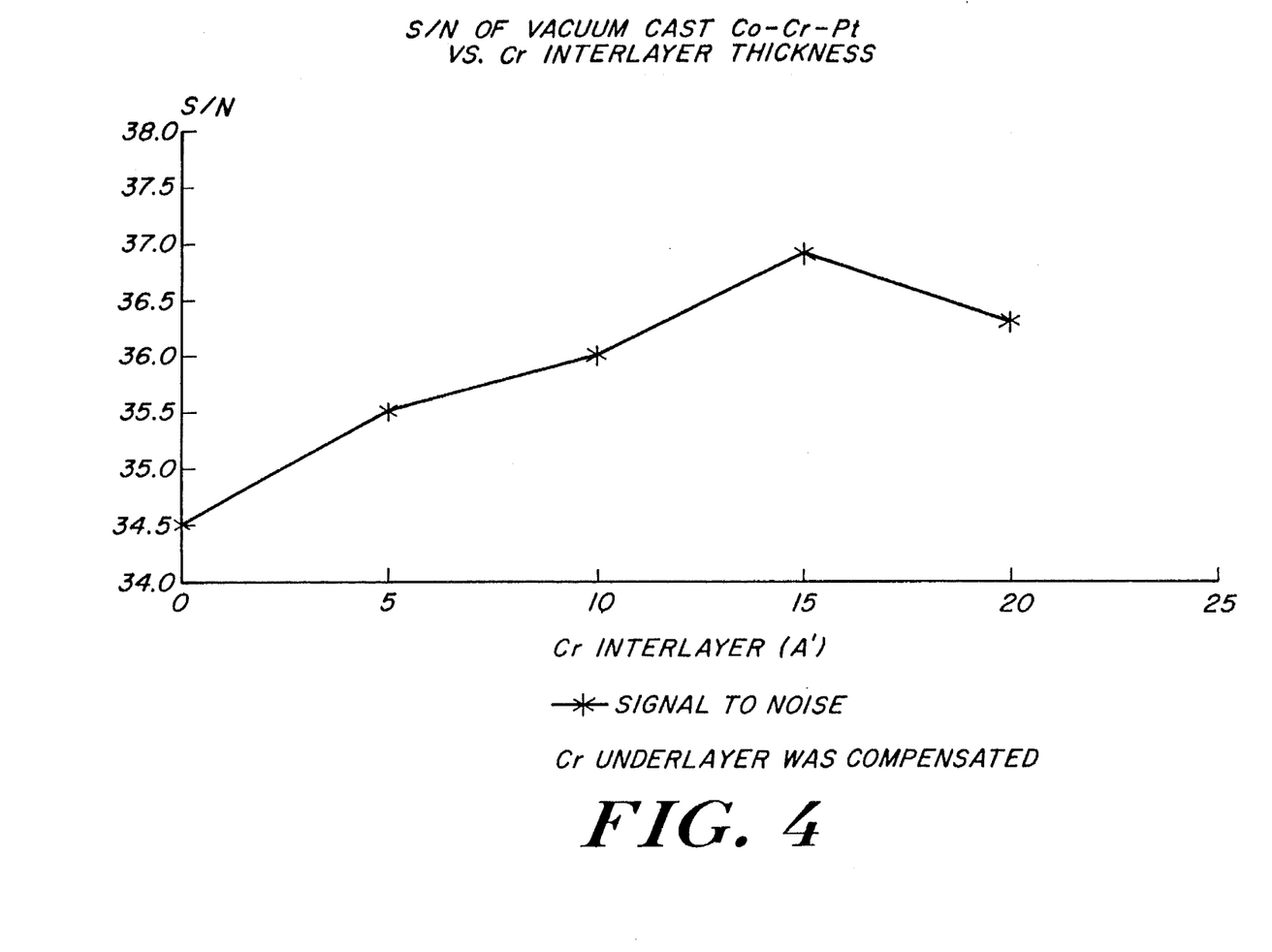
FIG. 4 is a plot of the improved signal-to-noise ratio available with a magnetic disk formed according to the present invention between the upper and lower magnetic layers.

A third measure of a significant property in a magnetic recording disk is illustrated in FIG. 4 which plots the signal-to-noise ratio achieved in a vacuum cast cobalt chromium platinum magnetic recording layer versus flash chromium layer thickness. The objective, of course, is to maximize the signal-to-noise ratio to optimize the ability to record and read back data. Once again, it is apparent that for flash chromium layers of 5 to 25 Å, a very useful signal-to-noise ratio is achieved, with the improvement diminishing beyond a 25 Å thickness.

Figure 5:
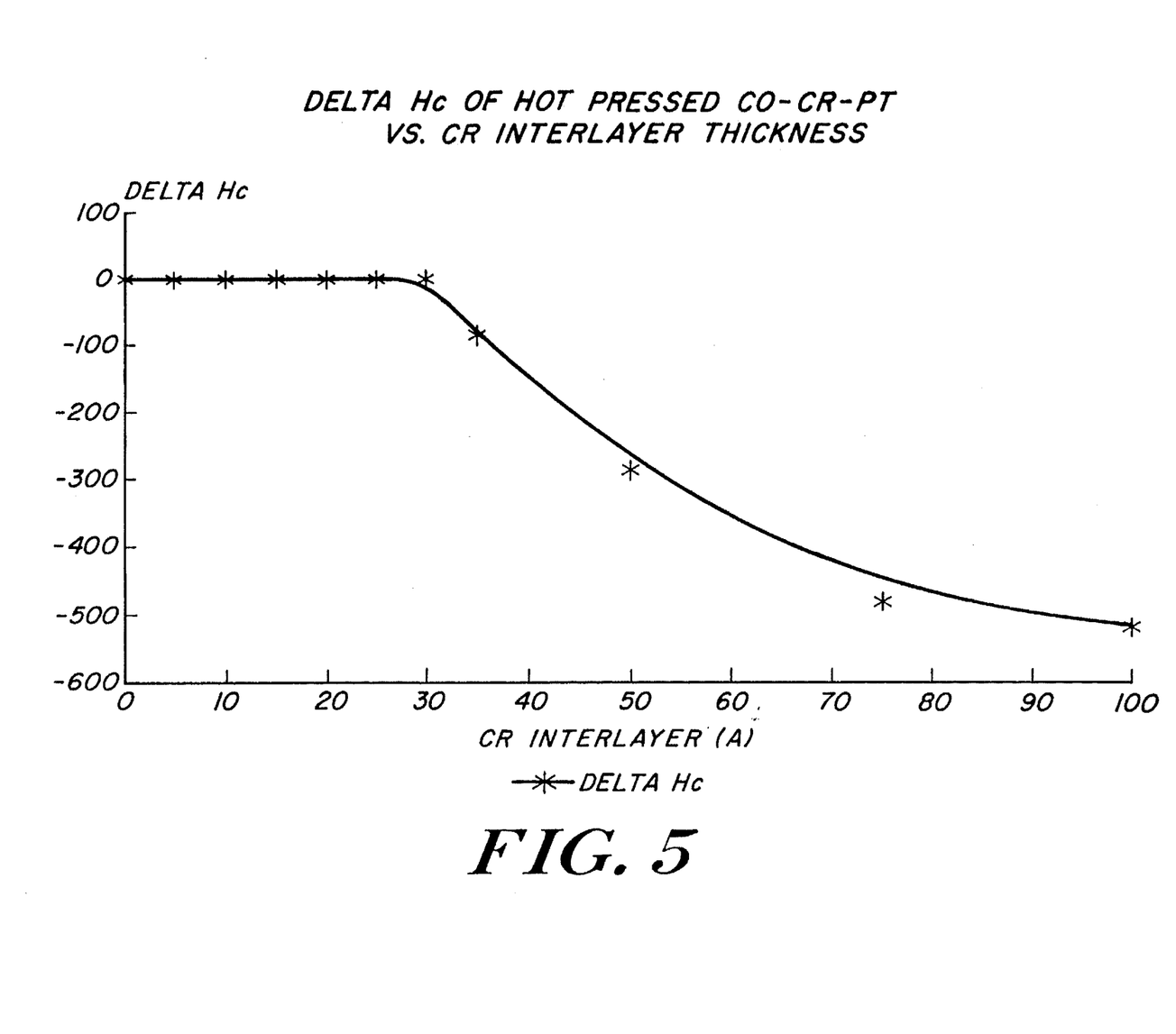
FIG. 5 is a plot of the $H_c$ (coercivity) change between upper and lower magnetic layers versus chromium interlayer thickness for different intermagnetic layers formed according to the present invention.

A more dramatic comparison of the $H_c$ change between upper and lower magnetic layers (coercivity) of a magnetic disk based on the chromium flash layer thickness is illustrated in FIG. 5. FIG. 5 plots $\Delta H_c$ of hot pressed cobalt-chromium-platinum versus chromium interlayer thickness. It can be seen that the $\Delta H_c$ is zero for flash non-magnetic layer thicknesses up to about 30 Å, after which it markedly decreases, illustrating a degradation in the expected magnetic recording performance of disks having chromium layer thicknesses of 30 to 100 Å as presently practiced relative to the improved results of a flash interlayer of 5 to 15 Å as taught herein.

Figure 6:
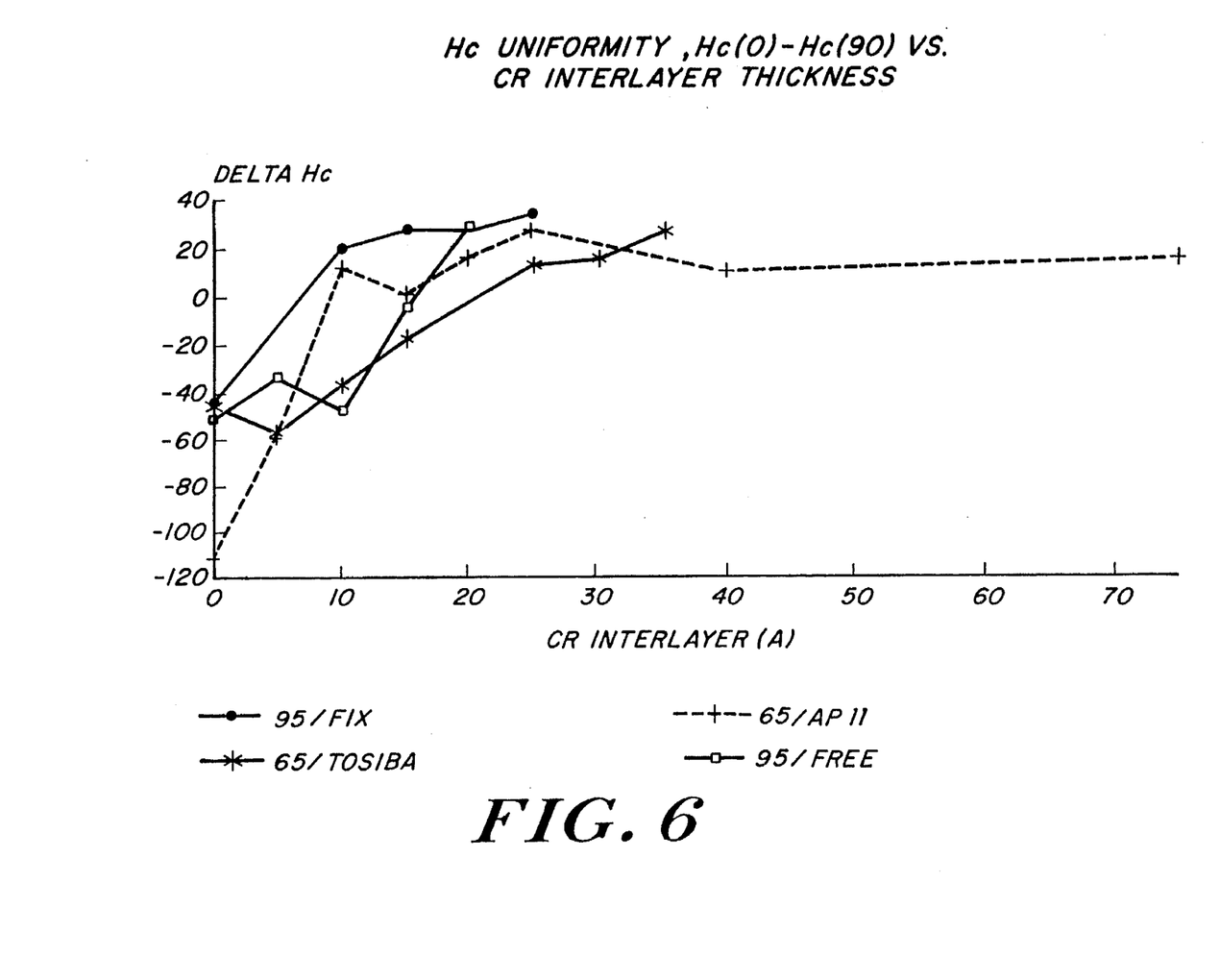
FIG. 6 illustrates the $H_c$ uniformity achieved around a disk formed according to the present invention.

FIG. 6 plots $H_c$ uniformity for $H_c(0)-H_c(90)$ versus chromium flash layer thickness. The graphs represent tests run on different systems, and indicate an optimum result at about 15 Å, and highly useful results within the disclosed range of about 5 to 25 Å.

Figure 7:
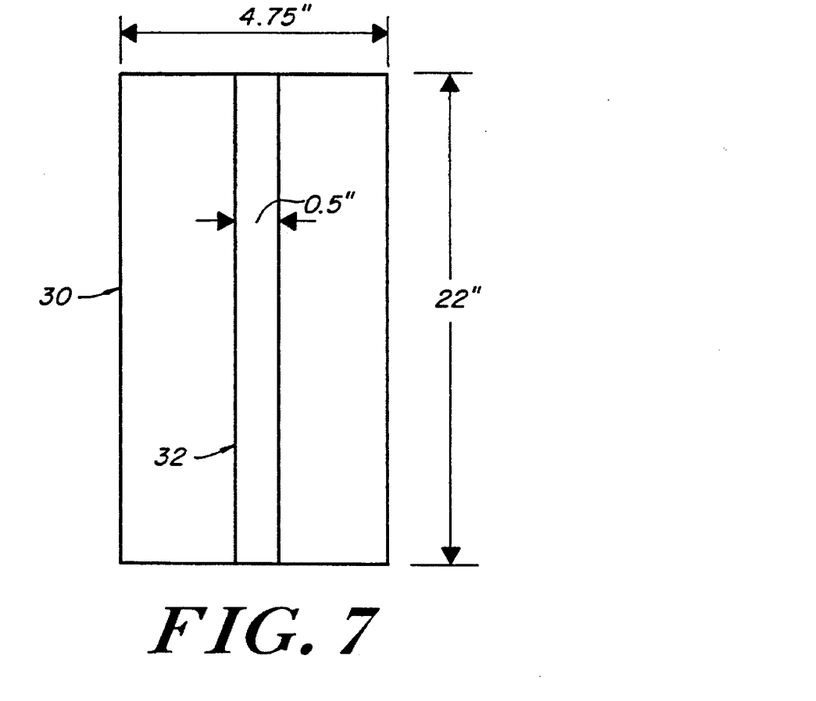
FIG. 7 illustrates schematically the apparatus for sputtering the flash non-magnetic layer.
Figure 8:
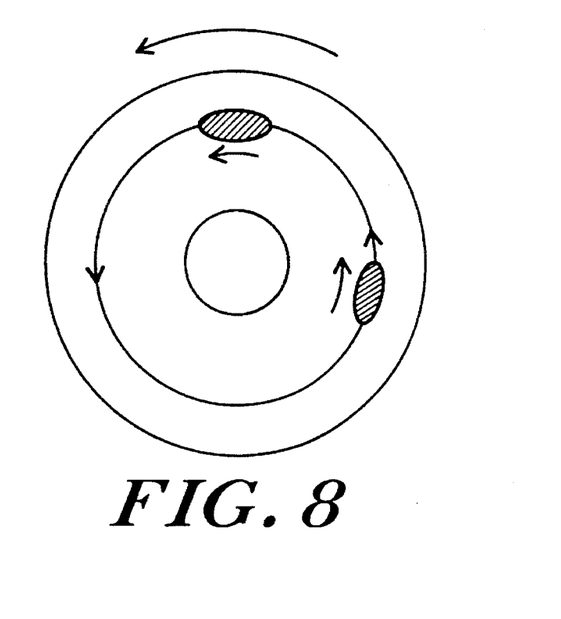
FIG. 8 plots magnetic anisotropy over the disk surface.

FIG. 7 illustrates, schematically, the apparatus used to sputter the flash chromium intermagnetic layer, comprising a shutter aperture 30 including a slot 32 about ½ inch wide, the shutter being sufficiently large to cover the sputtering target and being placed about 2 inches away from the target so that only sputtered ions with high incident angles impact the disk to be sputtered. It has been found that this results in, not only the desired flash interlayer of 5 to 25 Å being deposited over the surface of the disk, but that the sputtered ions at a low incidence angle are blocked and are not deposited. As shown in FIG. 8, the magnetic anisotropy has been found to then always line up along the circular recording path along which the data is recorded, a highly desirable result and incidental benefit of the claimed method.

From the above, it can be appreciated how the objects and features of the advantages of the invention are achieved. The method of the invention allows for producing in a highly consistent fashion a magnetic disk incorporating a flash non-magnetic layer which significantly improves the magnetic recording characteristics of the disk. The recording disk of the invention has improved magnetic coercivity signal-to-noise ratio and the like, and these improvements are uniform over the surface of the disk.

Although the invention has been described with reference to particular embodiments, it can be appreciated that changes and modifications may be made without departing from the spirit and scope of the present invention.

What is claimed is:

1. A magnetic recording medium comprising:

a substrate, a first film of magnetic recording material overlying said substrate, a discontinuous sputtered chromium layer sputter deposited directly on said first film of magnetic recording material, and a second film of magnetic recording material overlying said discontinuous chromium layer and said first film of magnetic recording material, such that portions of said second film of magnetic recording material are in direct contact with said discontinuous sputtered chromium layer and said first film of magnetic recording material said discontinuous chromium layer having a thickness of about 5 to 15 angstroms.

2. The recording medium of claim 1 wherein each of said first and second films of magnetic recording material comprise a cobalt alloy.

3. The recording medium of claim 2 wherein said cobalt alloy comprises cobalt, chromium, and platinum.

4. A method for making a magnetic recording medium comprising the steps of providing a substrate depositing a first film of magnetic recording material comprising a cobalt alloy over said substrate, sputter depositing a discontinuous sputtered chromium layer directly on said first film of magnetic recording material, and depositing a second film of magnetic recording material on said discontinuous sputtered chromium layer and said first film of magnetic recording material, such that portions of said second film of magnetic recording material are in direct contact with said discontinuous sputtered chromium layer and said first film of magnetic recording material, said second film of magnetic recording material comprising a cobalt alloy, said discontinuous sputtered chromium layer being sputter deposited to a thickness of from about 5 to 15 angstroms.

5. The method of claim 4 wherein said substrate member is aluminum, and including the steps of depositing a layer of nickel phosphorous over said aluminum substrate, and depositing a layer of chromium over said nickel phosphorous layer, and depositing said first cobalt alloy magnetic recording layer over said chromium layer.

6. A method as claimed in claim 4 wherein said cobalt alloy comprises cobalt-chromium-platinum.

7. A method as claimed in claim 6 wherein said cobalt-chromium-platinum alloy is deposited to a thickness of about 200 to 400 Å per layer.

8. In a method for preparing a magnetic recording disk having a disk-shaped substrate supporting a first film comprising cobalt alloy magnetic recording material, said method comprising the steps of sputter depositing a discontinuous chromium layer directly on said first film comprising cobalt alloy magnetic recording material, and depositing a second film comprising cobalt alloy magnetic recording material overlying said discontinuous sputtered chromium layer and said first film comprising cobalt alloy magnetic recording material, such that portions of said second film comprising cobalt alloy magnetic recording material are in direct contact with said discontinous sputtered chromium layer and said first film comprising cobalt alloy magnetic recording material, said discontinuous sputtered chromium layer being sputter deposited to a thickness of from about 5 to 15 angstroms.

9. A method as claimed in claim 8 wherein said cobalt alloy layers comprise cobalt-chromium-platinum.

10. The product made by the method of claims 8 or 9.

* * * * *